US012625961B2

(12) United States Patent
Chechik et al.

(10) Patent No.: US 12,625,961 B2
(45) Date of Patent: May 12, 2026

(54) MALICIOUS DIRECT SYSCALL CALL DETECTION

(71) Applicant: PALO ALTO NETWORKS (ISRAEL ANALYTICS) LTD., Tel Aviv (IL)

(72) Inventors: Or Chechik, Rishon LeZion (IL); Ofir Ozer, Tel Aviv (IL); Ori Damari, Ramat Gan (IL); Yuval Zan, Givatayim (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 17 days.

(21) Appl. No.: 18/789,764

(22) Filed: Jul. 31, 2024

(65) Prior Publication Data

US 2026/0037628 A1 Feb. 5, 2026

(51) Int. Cl.
| | |
|---|---|
| *G06F 15/16* | (2006.01) |
| *G06F 9/54* | (2006.01) |
| *G06F 21/56* | (2013.01) |
| *H04L 29/06* | (2006.01) |

(52) U.S. Cl.
CPC ...... *G06F 21/566* (2013.01); *G06F 2221/034* (2013.01)

(58) Field of Classification Search
CPC ............. G06F 21/566; G06F 2221/034; G06F 2221/033
USPC .......................................................... 726/23
See application file for complete search history.

(56) References Cited

U.S. PATENT DOCUMENTS

| | | | | |
|---|---|---|---|---|
| H2196 H | * | 7/2007 | Tester | 726/22 |
| 7,950,057 | B1 | 5/2011 | Kennedy et al. | |
| 8,205,257 | B1 | 6/2012 | Satish et al. | |
| 8,539,578 | B1 | 9/2013 | Zhou et al. | |
| 8,601,584 | B1 | 12/2013 | Lu et al. | |
| 8,640,235 | B2 * | 1/2014 | Repasi | G06F 21/55 726/25 |
| 8,646,076 | B1 | 2/2014 | Lim et al. | |

(Continued)

FOREIGN PATENT DOCUMENTS

| | | | | |
|---|---|---|---|---|
| CN | 115033879 A | * | 9/2022 | G06F 21/57 |
| JP | 2010-509654 A | | 3/2010 | |

(Continued)

OTHER PUBLICATIONS

1 International Application # PCT/US2025/016969 Search Report dated Apr. 22, 2025.

(Continued)

*Primary Examiner* — Hamza N Algibhah
(74) *Attorney, Agent, or Firm* — Meitar Patents LTD.; Daniel Kligler

(57) ABSTRACT

Methods, storage systems and computer program products implement embodiments of the present invention for protecting a computer by first deploying in a memory of the computer a hooked version of a syscall used by an operating system kernel of the computer A notification of a call to the hooked version of the syscall from a user mode of the computer is received from the hooked version of the syscall, the notification including a return address in the memory and a set of features extracted from the call. The return address and the received features are analyzed so as to classify the call as benign or malicious, and an alert is generated for the computer upon classifying the new call as malicious.

23 Claims, 5 Drawing Sheets

(56)  References Cited

U.S. PATENT DOCUMENTS

| | | | |
|---|---|---|---|
| 8,990,944 | B1 | 3/2015 | Singh et al. |
| 9,256,552 | B2 | 2/2016 | Epstein |
| 9,659,182 | B1 | 5/2017 | Roundy et al. |
| 10,193,918 | B1 | 1/2019 | Patton et al. |
| 10,409,981 | B2 * | 9/2019 | Iyengar .................. G06F 21/52 |
| 10,503,904 | B1 | 12/2019 | Singh et al. |
| 10,860,718 | B2 | 12/2020 | Seetharamaiah et al. |
| 11,216,559 | B1 | 1/2022 | Gu et al. |
| 11,409,868 | B2 | 8/2022 | Reid et al. |
| 11,520,886 | B2 | 12/2022 | Levy et al. |
| 11,886,585 | B1 | 1/2024 | Davis |
| 11,934,801 | B2 | 3/2024 | Rahmani et al. |
| 12,223,044 | B1 * | 2/2025 | Jung ..................... G06F 21/564 |
| 2004/0049693 | A1 | 3/2004 | Douglas |
| 2005/0091558 | A1 * | 4/2005 | Chess .................. G06F 21/566 |
| | | | 714/38.13 |
| 2006/0005200 | A1 | 1/2006 | Vega et al. |
| 2006/0143707 | A1 * | 6/2006 | Song ........................ G06F 21/52 |
| | | | 726/22 |
| 2008/0040800 | A1 * | 2/2008 | Park ...................... G06F 21/562 |
| | | | 726/22 |
| 2009/0049550 | A1 | 2/2009 | Shevchenko |
| 2012/0047515 | A1 | 2/2012 | Kanetomo |
| 2012/0255004 | A1 | 10/2012 | Salam |
| 2013/0227680 | A1 | 8/2013 | Pavlyushchik |
| 2014/0115652 | A1 | 4/2014 | Kapoor et al. |
| 2015/0199514 | A1 | 7/2015 | Tosa et al. |
| 2015/0213260 | A1 | 7/2015 | Park |
| 2015/0215335 | A1 * | 7/2015 | Giuliani ................ G06F 21/554 |
| | | | 726/23 |
| 2016/0055337 | A1 | 2/2016 | El-Moussa |
| 2016/0232347 | A1 | 8/2016 | Badishi |
| 2017/0180421 | A1 | 6/2017 | Shieh et al. |
| 2018/0068115 | A1 | 3/2018 | Golovkin et al. |
| 2018/0115577 | A1 | 4/2018 | Shukla et al. |
| 2018/0189490 | A1 | 7/2018 | Maciejak et al. |
| 2018/0191779 | A1 | 7/2018 | Shieh et al. |
| 2018/0211038 | A1 | 7/2018 | Breiman et al. |
| 2018/0248896 | A1 | 8/2018 | Challita et al. |
| 2019/0087572 | A1 | 3/2019 | Ellam et al. |
| 2019/0109870 | A1 | 4/2019 | Bedhapudi et al. |
| 2019/0121978 | A1 | 4/2019 | Kraemer et al. |
| 2019/0138727 | A1 | 5/2019 | Dontov et al. |
| 2019/0318090 | A1 * | 10/2019 | Sandoval .............. G06F 21/554 |
| 2019/0325133 | A1 | 10/2019 | Goodridge et al. |
| 2019/0347418 | A1 | 11/2019 | Strogov et al. |
| 2020/0089876 | A1 | 3/2020 | Aharoni et al. |
| 2020/0106808 | A1 | 4/2020 | Schutz et al. |
| 2020/0183820 | A1 | 6/2020 | Hebert et al. |
| 2020/0204589 | A1 | 6/2020 | Strogov et al. |
| 2020/0342100 | A1 | 10/2020 | Goldstein et al. |
| 2021/0152595 | A1 | 5/2021 | Hansen et al. |
| 2022/0222338 | A1 | 7/2022 | Gupta |
| 2022/0284095 | A1 | 9/2022 | Ahmed |
| 2023/0084691 | A1 | 3/2023 | Levy et al. |

FOREIGN PATENT DOCUMENTS

| | | | | |
|---|---|---|---|---|
| JP | 2015141718 | A | | 8/2015 |
| KR | 20090088198 | A * | 8/2009 | ........... G06F 21/562 |
| KR | 20100078081 | A * | 7/2010 | ............. G06F 21/00 |
| KR | 20120031745 | A * | 4/2012 | ............. G06F 21/57 |
| KR | 20120126667 | A * | 11/2012 | ........... G06F 21/566 |
| RU | 2012113963 | A * | 10/2013 | ............. G06F 11/00 |
| WO | 2008056944 | A1 | 5/2008 | |
| WO | 2022109664 | A1 | 6/2022 | |
| WO | 2022248920 | A1 | 12/2022 | |
| WO | 2023133582 | A1 | 7/2023 | |

OTHER PUBLICATIONS

Blackberry, "Threat Spotlight: Petya-Like Ransomware is Nasty Wiper", pp. 1-22, Nov. 7, 2017, as downloaded from https://blogs.blackberry.com/en/2017/07/threat-spotlight-petya-like-ransomware-is-nasty-wiper.

Wikipedia, "Java Virtual Machine," pp. 1-8, last update Oct. 25, 2022.

Cristalli et al., "Trusted Execution Path for Protecting Java Applications Against Deserialization of Untrusted Data," Proceedings, International Conference, ICB 2007—Advances in Biometrics, Springer Nature Switzerland AG, pp. 445-464, year 2018.

Wikipedia, "Java Remote Method Invocation," pp. 1-4, last edited Dec. 26, 2020.

Wikipedia, "Metasploit Project," pp. 1-7, last edited Jun. 7, 2022.

Cynet, "Cobalt Strike: White Hat Hacker Powerhouse in the Wrong Hands," pp. 1-6, last updated Jun. 27, 2022, as downloaded from https://web.archive.org/web/20220627023847/https://www.cynet.com/network-attacks/cobalt-strike-white-hat-hacker-powerhouse-in-the-wrong-hands/.

Shah, "Analyzing CVE-2017-9791: Apache Struts Vulnerability Can Lead to Remote Code Execution,", McAfee, pp. 1-7, Jul. 19, 2017, as downloaded from https://www.mcafee.com/blogs/other-blogs/mcafee-labs/analyzing-cve-2017-9791-apache-struts-vulnerability-can-lead-remote-code-execution/.

Frohoff, "A Proof-of-Concept Tool for Generating Payloads that Exploit unsafe Java Object Deserialization," github.com, pp. 1-3, Jul. 16, 2022, as downloaded from https://github.com/frohoff/ysoserial.

Wikipedia, "Return-oriented Programming," pp. 1-6, last edited Mar. 31, 2020, as downloaded from https://web.archive.org/web/20200403142512/https://en.wikipedia.org/wiki/Return-oriented_programming.

Mcnab, "Network Security Assessment", 2nd edition, Chapter 16 (Exploitation Frameworks), pp. 393-414, Oct. 2007.

Balakrishnan, "Understanding Java Agents," Tutorial, pp. 1-8, Jul. 6, 2020, as downloaded from https://dzone.com/articles/java-agent-1.

Wilson, "Windows Inline Function Hooking," Blog Entry, LRQA Nettitude, pp. 1-11, Mar. 18, 2015, as downloaded from https://blog.nettitude.com/uk/windows-inline-function-hooking.

Palo Alto Networks, "Cortex XDR," Datasheet, pp. 1-9, year 2023.

U.S. Appl. No. 17/979,004 Office Action dated Jun. 6, 2024.

Chechik et al., U.S. Appl. No. 18/301,366, filed Apr. 17, 2023.

Chechik et al., U.S. Appl. No. 18/676,573, filed May 29, 2024.

Aharoni et al., U.S. Appl. No. 18/779,134, filed Jul. 22, 2024.

U.S. Appl. No. 17/979,004 Office Action dated Sep. 6, 2024.

AU Application # 2021447019 Office Action dated Sep. 16, 2024.

Bauman et al, "Renewable Just-In-Time Control-Flow Integrity", Proceedings of the 26th International Symposium On Research in Attacks, Intrusions and Defenses, Oct. 16, 2023 (Oct. 16, 2023), pp. 580-594, https://dl.acm.org/doi/pdf/10.1145/3607199.3607239.

PCT International Search Report and Written Opinion for international application No. PCT/US2025/035110, dated Oct. 8, 2025.

Non-final Office Action, U.S. Appl. No. 18/676,573, dated Aug. 27, 2025.

Notice of References Cited, U.S. Appl. No. 18/676,573, dated Aug. 27, 2025.

Final Office Action, U.S. Appl. No. 18/676,573, dated Dec. 3, 2025.

JP Office Action, Patent Application No. 2023-572867 dated Jan. 7, 2025.

JP Notice of Allowance, JP Patent Application No. 2023-572867 dated Mar. 4, 2025.

Notice of References Cited, U.S. Appl. No. 18/779,134, dated Oct. 23, 2025.

Non-Final Office Action, U.S. Appl. No. 18/779,134, dated Oct. 23, 2025.

* cited by examiner

MALICIOUS DIRECT SYSCALL CALL DETECTION

FIELD OF THE INVENTION

The present invention relates generally to computer security, and particularly to identifying direct calls to operating system kernel syscalls, and classifying the detected direct calls as benign or malicious.

BACKGROUND OF THE INVENTION

System calls, also known as syscalls, serve as a bridge between user-level programs and an operating system kernel. They enable programs to request essential services from the kernel, such as file operations, process management, and network communication. When a program initiates (i.e., calls) a syscall, it transitions from user mode to kernel mode, granting access to privileged operations. The syscall function in the kernel executes the requested task by interacting with kernel data structures. After completing the operation, the syscall function returns a value (e.g., a file descriptor or an error code) to the program, indicating the outcome of the operation. To return from the syscall, a special instruction is executed to switch control back to user mode, allowing the program to access return values stored in registers or memory locations for further processing.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for protecting a computer, including deploying in a memory of the computer a hooked version of a syscall used by an operating system kernel of the computer, receiving, from the hooked version of the syscall, a notification of a call to the hooked version of the syscall from a user mode of the computer, the notification including a return address in the memory and a set of features extracted from the call, analyzing the return address and the received features so as to classify the call as benign or malicious, and generating, for the computer, an alert upon classifying the new call as malicious.

In one embodiment, the return address includes identifying the return address as belonging to a specified block in a user-mode segment of the memory.

In some embodiments, the specified block is not allocated to a specified DLL.

In another embodiment, classifying the call as malicious includes classifying the call as a direct call.

In some direct call embodiments, the call includes a new call, and wherein the features further include additional features from previous direct calls to the hooked version of the syscall by execution entities executing in the memory of the computer and additional computers, wherein the new call and previous calls were conveyed during multiple days, and wherein one or more organizations include the computers.

In a first profile embodiment, a given feature includes a mapped block in the memory including the execution entities, wherein analyzing the features includes identifying a number of distinct execution entities that generated the direct calls from the mapped block, and wherein classifying the new call as malicious includes identifying that identified number is less than a specified threshold.

In a second profile embodiment, a given feature includes a mapped block in the memory including the execution entities, wherein analyzing the features includes identifying a number of distinct days when any of the computers having the given feature, and wherein classifying the new call as malicious includes identifying that identified number is less than a specified threshold.

In a third profile embodiment, the method further includes defining a key including first and second features, the first feature including a given execution entity that conveyed one or more of the direct calls, and the second feature including a mapped block in the memory including an execution entity that generated one or more of the direct calls, wherein analyzing the features includes identifying a number of distinct computers having the key, and wherein classifying the new call as malicious includes identifying that identified number is less than a specified threshold.

In a fourth profile embodiment, the method further includes defining a key including first and second features, the first feature including a given execution entity that conveyed one or more of the direct calls, and the second feature including a mapped block in the memory including an execution entity that generated one or more of the direct calls, wherein analyzing the features includes identifying a number of distinct days when any of the computers have the key, and wherein classifying the new call as malicious includes identifying that identified number is less than a specified threshold.

In a fifth profile embodiment, the method further includes defining a key including first and second features, the first feature including a given execution entity that conveyed one or more of the direct calls, and the second feature including a mapped block in the memory including an execution entity that generated one or more of the direct calls, wherein analyzing the features includes identifying a number of distinct organizations including the computers having the key, and wherein classifying the new call as malicious includes identifying that identified number is less than a specified threshold.

In a sixth profile embodiment, the method further includes defining a key including first and second features, the first feature including a given execution entity that conveyed one or more of the direct calls, and the second feature including the hooked version of the syscall, wherein analyzing the features includes identifying a number of distinct memory blocks including the key, and wherein classifying the new call as malicious includes identifying that identified number is less than a specified threshold.

In a seventh profile embodiment, the method further includes defining a key including first and second features, the first feature including a process that conveyed one or more of the direct calls, and the second feature including the hooked version of the syscall, wherein analyzing the features includes identifying a number of distinct computers including the key, and wherein classifying the new call as malicious includes identifying that identified number is less than a specified threshold.

In an eighth profile embodiment, the method further includes defining a key including first and second features, the first feature including a given execution entity that conveyed one or more of the direct calls, and the second feature including the hooked version of the syscall, wherein analyzing the features includes identifying a number of distinct days when any of the computers have the key, and wherein classifying the new call as malicious includes identifying that identified number is less than a specified threshold.

In some profile embodiments, one or more of the computers execute shellcodes including respective shellcode headers.

In a ninth profile embodiment, a given feature includes a given execution entity that one or more of the computers executed from any of the shellcodes, and that conveyed one or more of the direct calls, wherein analyzing the features includes identifying a number of distinct computers having the given feature, and wherein classifying the new call as malicious includes identifying that identified number is less than a specified threshold.

In a tenth profile embodiment, a given feature includes a given execution entity that one or more of the computers executed from any of the shellcodes, and that conveyed one or more of the direct calls, wherein analyzing the features includes identifying a number of distinct days when any of the computers have the given feature, and wherein classifying the new call as malicious includes identifying that identified number is less than a specified threshold.

In an eleventh profile embodiment, a given feature includes a given execution entity that one or more of the computers executed from any of the shellcodes, and that conveyed one or more of the direct calls, wherein analyzing the features includes identifying a number of distinct shellcode headers having execution entities identical to the given feature, and wherein classifying the new call as malicious includes identifying that identified number is less than a specified threshold.

In a twelfth profile embodiment, the method further includes defining a key including first and second features, the first feature including a given execution entity that one or more of the computers executed from any of the shellcodes, and the second feature a given shellcode header for a given shellcode that spawned a given execution entity, wherein analyzing the features includes identifying a number of distinct computers having the key, and wherein classifying the new call as malicious includes identifying that identified number is less than a specified threshold.

In a thirteenth profile embodiment, the method further includes defining a key including first and second features, the first feature including a given execution entity that one or more of the computers executed from any of the shellcodes, and the second feature a given shellcode header for a given shellcode that spawned a given execution entity, wherein analyzing the features includes identifying a number of distinct days when any of the computers have the key, and wherein classifying the new call as malicious includes identifying that identified number is less than a specified threshold.

In a fourteenth profile embodiment, the method further includes defining a key including first and second features, the first feature including a given execution entity that one or more of the computers executed from any of the shellcodes, and the second feature a given shellcode header for a given shellcode that spawned a given execution entity, wherein analyzing the features includes identifying a number of distinct organizations including the computers having the key, and wherein classifying the new call as malicious includes identifying that identified number is less than a specified threshold.

In a fifteenth profile embodiment, the method further includes defining a key including first and second features, the first feature including the hooked version of the syscall, and the second feature a given shellcode header for a given shellcode that spawned a given execution entity, wherein analyzing the features includes identifying a number of distinct computers having the key, and wherein classifying the new call as malicious includes identifying that identified number is less than a specified threshold.

In a sixteenth profile embodiment, the method further includes defining a key including first and second features, the first feature including the hooked version of the syscall, and the second feature a given shellcode header for a given shellcode that spawned a given execution entity, wherein analyzing the features includes identifying a number of distinct days when any of the computers in a given organization have the key, and wherein classifying the new call as malicious includes identifying that identified number is less than a specified threshold.

In a seventeenth profile embodiment, the method further includes defining a key including first and second features, the first feature including the hooked version of the syscall, and the second feature a given shellcode header for a given shellcode that spawned a given execution entity, wherein analyzing the features includes identifying a number of distinct execution entities having the key, and wherein classifying the new call as malicious includes identifying that identified number is less than a specified threshold.

There is also provided, in accordance with an embodiment of the present invention, a security server including a memory, and a processor configured to deploy, in the memory, a hooked version of a syscall used by an operating system kernel of a computer, to receive, from the computer, a notification of a call to a hooked version of the syscall from a user mode of the second computer, the notification including a return address in the memory and a set of features extracted from the call, to analyze the return address and the received features so as to classify the call as benign or malicious, and to generate, for the computer, an alert upon classifying the new call as malicious.

There is additionally provided, in accordance with an embodiment of the present invention, a computer software product for protecting a computer, the computer software product including a non-transitory computer-readable medium, in which program instructions are stored, which instructions, when read by the computer, cause the computer to deploy in a memory of the computer a hooked version of a syscall used by an operating system kernel of the computer, to receive, from the hooked version of the syscall, a notification of a call to the hooked version of the syscall from a user mode of the computer, the notification including a return address in the memory and a set of features extracted from the call, to analyze the return address and the received features so as to classify the call as benign or malicious, and to generate, for the computer, an alert upon classifying the new call as malicious.

BRIEF DESCRIPTION OF THE DRAWINGS

The disclosure is herein described, by way of example only, with reference to the accompanying drawings, wherein.

DETAILED DESCRIPTION OF EMBODIMENTS

A system call (syscall) can be considered both a function and a call to a function, depending on the context. From the perspective of a user-space program, a system call appears as a function call. When a program wants to request a service provided by an operating system, such as opening a file or allocating memory, it invokes a function provided by the standard library. Internally, these functions ultimately make a system call to the kernel to perform the requested operation. So, in this sense, a system call is invoked like any other function call from the perspective of the user-space program.

However, from the perspective of the operating system, a system call represents a mechanism for allowing user-space programs to request services provided by the kernel. The kernel provides a set of entry points, each corresponding to a specific system call. When a user-space program makes a system call, it typically triggers a special instruction that transfers control to the kernel. The kernel's system call handler then dispatches the appropriate kernel function to handle the requested operation.

Embodiments described herein use the term "syscall" refers to a function, and the term "call to a syscall" refers to a call to a function.

A direct system call (syscall) attack can involve executing malicious code by embedding system calls directly within malware, thereby bypassing the conventional method of obtaining system calls via system libraries. In a syscall attack, the malware calls system calls in a manner that can evade detection by traditional security solutions such as endpoint detection and response (EDR) systems.

Embodiments of the present invention provide methods and systems for protecting a host computer by detecting malicious calls to syscalls (also referred to herein simply as malicious syscalls). As described hereinbelow, a hooked version of a syscall used by an operating system kernel of the computer is deployed in a memory of the computer.

Subsequent to deploying the hooked version of the syscall, a notification of a call to the hooked version of the syscall from a user mode of the computer is received from the hooked version of the syscall (i.e., from the deployed hook). In embodiments described herein, the notification comprises a return address in the memory and a set of features extracted from the call. The return address and the received features are analyzed so as to classify the call as benign or malicious, and an alert for the computer is generated upon classifying the new call as malicious.

In embodiments herein, if a given call to a given syscall is classified as malicious, then the given call is suspected to be part of an attack that is harmful to the operation of the host computer. Likewise, if the given call is classified as benign, then the given call is not suspected to be part of an attack that is harmful to the operation of the host computer.

System Description

Figure 1:
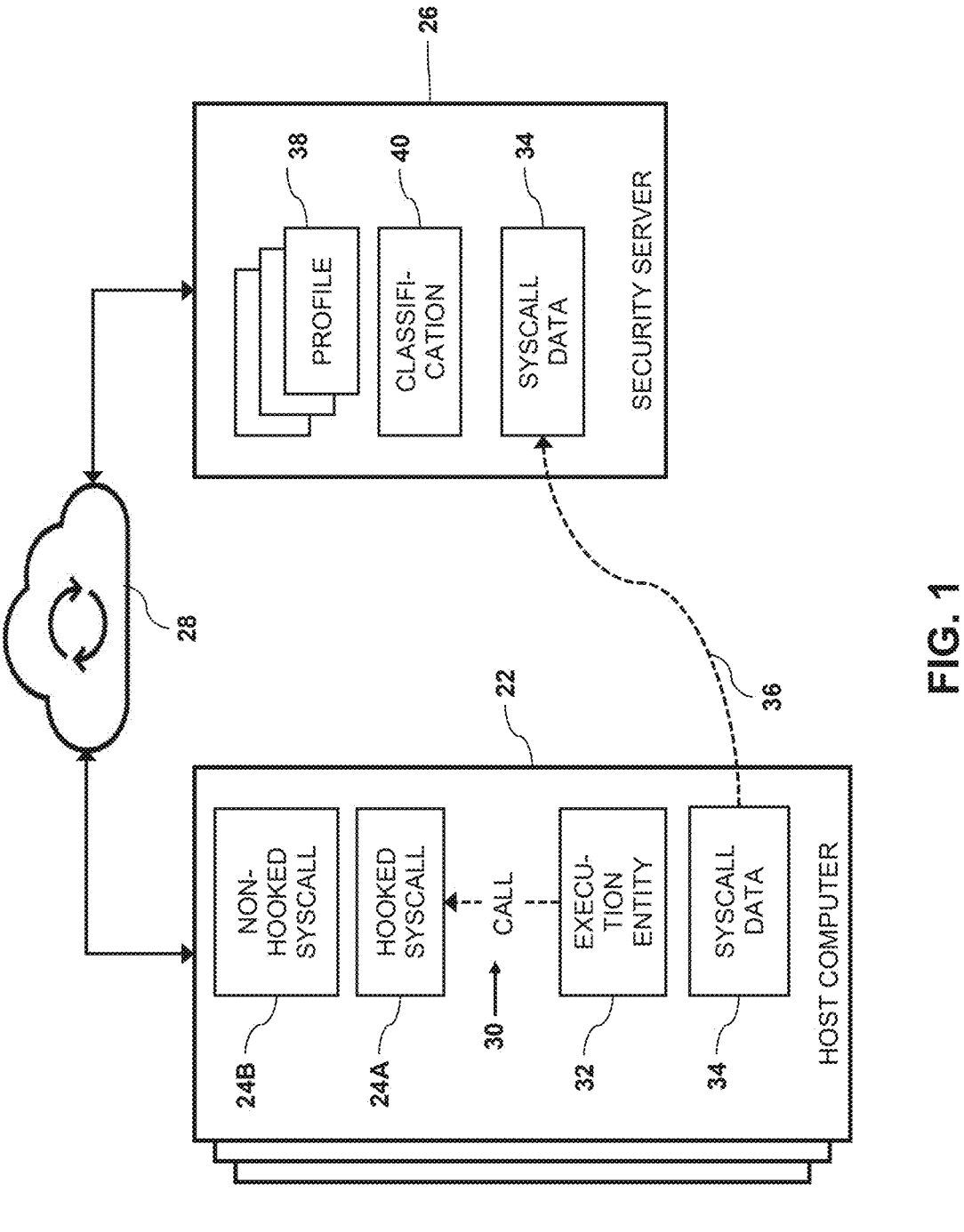
FIG. 1 is a block diagram showing an example of a computing facility comprising a set of host computers comprising endpoint agents that communicate with a security server so as to detect malicious calls to syscalls, in accordance with an embodiment of the present invention.

FIG. 1 is a block diagram that shows a computing facility 20 comprising a set of host computers 22 that execute a set of syscalls 24 and are configured to communicate with a security server 26 via a data network such as Internet 28, in accordance with an embodiment of the present invention. In embodiments herein, syscalls 24 can be differentiated by appending a letter to the identifying numeral, so that the syscalls comprise hooked syscalls 24A and non-hooked syscalls 24B.

In embodiments described hereinbelow, in response to receiving, by a given hooked syscall 24A executing on a given host computer 22, receiving a call 30 from an execution entity 32 (also executing on the given host computer), the given hooked syscall (i.e., executing on the host computer) can generate syscall data 34, and convey the syscall data to security server 26, as indicated by an arrow 36. Syscalls 24A and 24B (referred to herein collectively as syscalls 24) and syscall data 34 are described in the description referencing FIG. 2 hereinbelow.

Security server 26 comprises a set of profiles 38. Upon security server 26 receiving syscall data 34, the security server can model, using profiles 38, the received syscall data so as to generate a maliciousness classification 40 that predicts whether call 30 is benign or malicious. In embodiments herein, a malicious classification indicates that call 30 is (highly) suspected of belonging to a cyberattack that can harm the given host computer. Likewise, a benign classification indicates that call 30 is not suspected of belonging to a cyberattack on the given host computer. Profiles 30 are described in the description referencing FIG. 3 hereinbelow.

Figure 2:
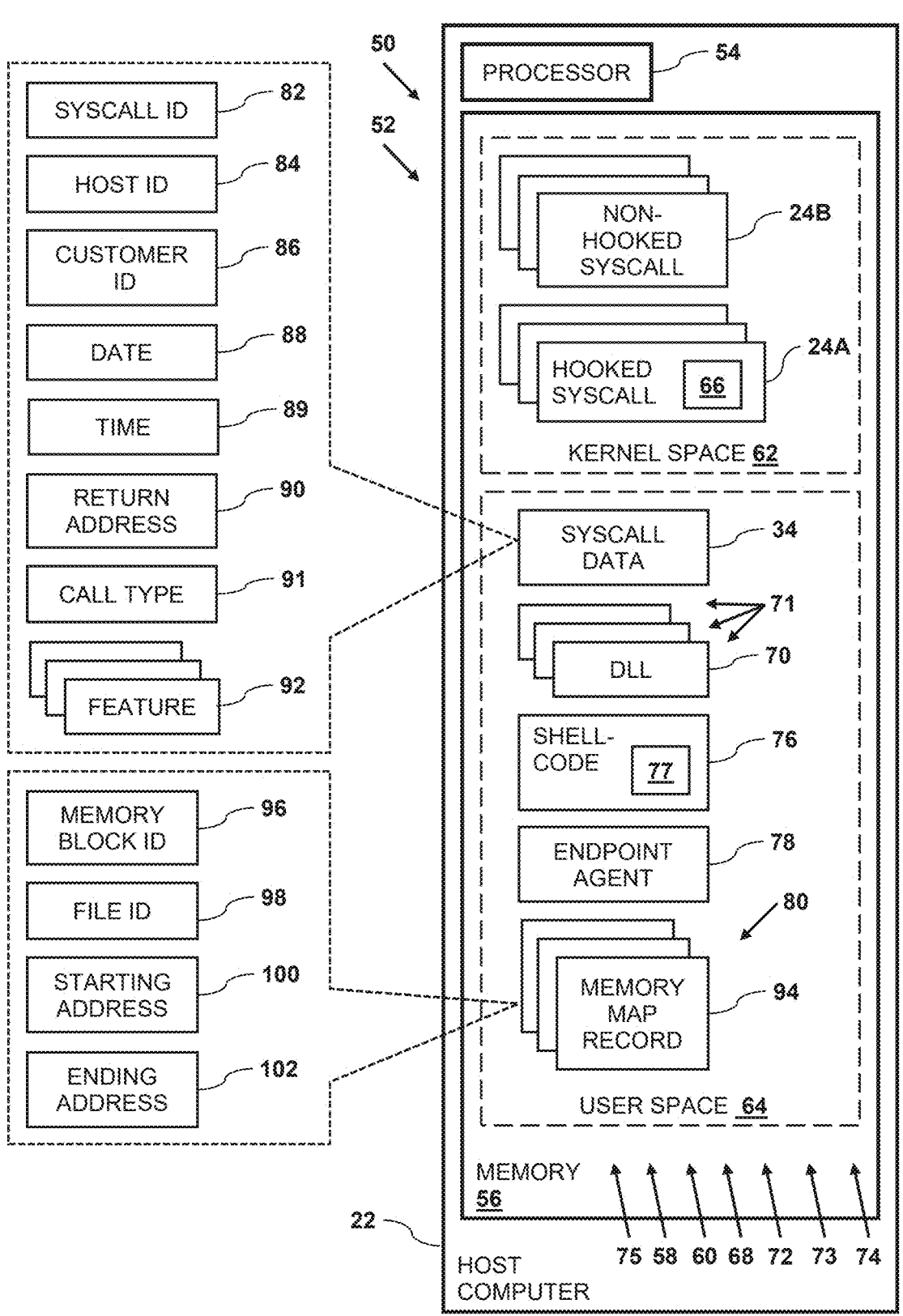
FIG. 2 is a block diagram showing hardware, software and data components of a given host computer, in accordance with an embodiment of the present invention.

FIG. 2 is a block diagram showing an example configuration of a given host computer 22 having a host identifier (ID) 50 and a customer ID 52, in accordance with an embodiment of the present invention. Host ID 50 comprises a unique identifier for the given host computer, and a customer ID 52. Customer IDs 52 reference respective organizations (e.g., customers and/or sites), and may be referred to herein as organizations 52.

Embodiments of the present invention can be used to analyze calls 30 to hooked syscalls 24A generated by execution entities 32 executing on multiple host computers 22 in multiple organizations (i.e., companies or company offices), wherein the organizations can be referenced by respective customer IDs 52

In the configuration shown in FIG. 2, each given host computer comprises a host processor 54 and a host memory 56 comprising a set of memory addresses 58. In embodiments described herein, processor 54 can execute, from memory 56, an operating system 60 having a kernel space 62 (i.e., a kernel-mode segment in memory 56) and a user space 64 (i.e., a user-mode segment in memory 56).

Kernel space 62 and user space 64 are two distinct regions in memory 56, each of the regions serving specific roles. Kernel space 62 is a privileged area where the operating system's core components reside, comprising syscalls 24 that can be configured to perform tasks such as managing (hardware) devices (not shown) and memory 56. Kernel space 62 operates at a higher privilege level than user space 64 so as to enable direct access to hardware resources and to execute privileged instructions.

In embodiments herein, kernel space 62 comprises syscalls 24 comprising hooked syscalls 24A and non-hooked syscalls 24B. As described hereinbelow, each given hooked syscall 24A comprises a given syscall 24 in operating system 60 that has been modified so as to generate a notification when it (i.e., the given syscall) is called. Non-hooked syscalls 24A comprise native (i.e., non-modified) syscalls 24 in operating system 60. Hooked syscalls 24A are also known as hot-patched syscalls.

In some embodiments, kernel space 62 may also be referred to as operating system kernel 62, a given operating system syscall 66 may also be referred to as a system call used by the operating system kernel of (host) computer, and hooked syscall 24A may also be referred to as a hooked version of a given syscall 24 used by the operating system kernel of the (host) computer.

The following are examples of operating system syscalls 24 in the WINDOWS™, operating system (produced by MICROSOFT CORPORATION, One Microsoft Way, Redmond, WA, USA) for managing processes 72 and threads 74 (i.e., in memory 56) that can be hooked in order to implement embodiments of the present invention:

NtMapViewOfSection maps a view of a section into the virtual address space of a given subject process 72.

NtProtectVirtualMemory changes the protection on a region of committed pages in the virtual address space of a given calling process 72.

NtAllocateVirtualMemory reserves and/or commits a region of pages within the user-mode virtual address space of a specified given process 72.

NtQueueApcThread queues, to a specified thread 74, an Asynchronous Procedure Call (APC) to be executed when the specified thread is in an alertable state.

NtSetContextThread sets the context of a specified thread 74, the context including the thread's registers and execution state.

NtReadVirtualMemory reads data from the virtual memory of a specified process 72 into a buffer of a calling process 72.

NtWriteVirtualMemory writes data from a buffer in a calling process 72 to the virtual memory of a specified process 72.

NtUnmapViewOfSection unmaps a mapped view of a section from the virtual address space of a calling process 72.

OpenRemoteToken opens an access token associated with a given process 72 or a given thread 74, thereby allowing modification of its privileges.

AdjustPrivilegesToken enables or disables privileges in an access token, which can affect the rights of a given process 72 or a given thread 74 associated with the token.

LoadModule loads a given module 68 to a subject process 72.

Conversely, user space 64 comprises user-level software applications (i.e., that execute on processor 54), such as text editors, web browsers, and games. In embodiments herein, these applications may comprise modules 68, libraries such as operating system dynamic link libraries (DLLs) 70 having respective DLL IDs 71, processes 72, and threads 74. In embodiments herein, execution entities 32 comprise the software applications, modules 68, DLLs 70, processes 72, and threads 74.

In some embodiments, memory 56 may also comprise files 73 (e.g., executable files and DLL files) and memory blocks 75, wherein each block 75 comprises a range of memory addresses 58 mapped to a given software application. Memory blocks 75 may also be referred to herein as mapped memory blocks 75.

Since these execution entities 32 operate at a lower privilege level (i.e., than operating system syscalls 66 in kernel space 62), they typically do not have direct access to system/hardware resources. Instead, the execution entities can rely on operating system syscalls 66 in order to access system resources. This separation ensures that kernel space

62 remains protected from arbitrary access and manipulation by the execution entities so as to maintain system stability and security.

In the configuration shown in FIG. 2, user space 64 comprises syscall data 34, DLLs 70, shellcode 76, a security endpoint agent 78 and a memory map 80. Shellcode 76 typically comprises a small piece of code used as a payload in the exploitation of a software vulnerability to execute arbitrary commands on a target machine, such as a given host computer 22. In a cyberattack, shellcode is often injected into a system's memory (e.g., memory 56) to open a backdoor, download malware, or escalate privileges, enabling the attacker to gain control over the compromised system. Although shellcode 76 does not typically comprise a section known as a "header" (i.e., a section of code comprising contains important supplementary information about the code), the first 16 bytes of shellcode 76 in embodiments herein is referred to as a shellcode header 77 (i.e., shellcode 76 comprises shellcode header 77).

In the configuration shown in FIG. 2, memory map 80 comprises a set of memory map records 94 that correspond to memory blocks 75, and can store information such as:

A memory block ID 96 referencing the corresponding memory block 75.

A file ID 98 referencing a given file 73. In embodiments herein, if a given memory block 75 (i.e., referenced by its corresponding memory block ID 96) is mapped from a given (executable or DLL) file 73, then the file ID references the given file. In some embodiments, if the file ID is null (or a specified value), then the corresponding memory block was dynamically allocated (i.e., by processor 54).

A starting address 100 referencing a first address 58 of the corresponding memory in memory 56.

An ending address 102 referencing a last address 58 of the corresponding memory block in memory 56.

In embodiments herein, upon a given execution entity 32 executing on a given host computer 22 issuing a given call 30 to a given hooked syscall 24A, endpoint agent 78 can analyze the given call (e.g., by communicating with the hooked syscall), and generate syscall data 34 based on the analysis. Syscall data 34 can store information such as:

A syscall ID 82 referencing the operating system syscall 60 corresponding to the given hooked syscall.

A host ID 84 comprising host ID 50 for the given host computer.

A customer ID 86 comprising customer ID 52 for the given host computer.

A date 88 of the given call to the given hooked syscall.

A time 89 (i.e., on date 88) of the given call to the given hooked syscall.

A return address 90 referencing a given memory address 58 where the control should be transferred after processor 54 completes execution of the given hooked syscall and its corresponding operating system syscall 66.

A call type 91 indicating whether the given call is direct or non-direct. In embodiments described hereinbelow, endpoint agent 78 can analyze a given call 30 so as to compute call type 91 (i.e., either direct or non-direct). In embodiments herein, endpoint agent storing a first call type value to call type 91 indicating that the given call is direct may also be referred to as classifying the given call as direct, and endpoint agent 78 storing a second call type value to call type 91 indicating that the given call is non-direct may also be referred to as classifying the given call as non-direct.

A set of features 92 that processor 54 can extract from the given call. Examples of features 92 include, but are not limited to:

An execution entity ID referencing a given execution entity 32 that generated the given call while executing on the given host computer. In some embodiments, the execution entity ID may comprise a computed hash value for the given execution entity.

A given memory block 75 comprising the given execution entity.

A path of the given execution entity that generated the given call. This is typically a path of a given executable file 73 that launched a given process 72 that generated the given call.

Signature information for the given execution entity that generated the given call. The signature information comprises data for the digital signature used to sign the executable file (see path hereinabove). This data can be used to show the validity and authenticity of the executable file. Examples of signature information include, signature validity, and identity of a vendor that signed the executable file, and an identity of a product associated with the executable file.

A computed hash for the given execution entity that generated the given call.

A memory size for the given execution entity that generated the given call.

A given address 58 where the given execution entity that generated the given call is stored in memory 56 for the given execution entity that generated the given call.

One or more execution privileges for the given execution entity that generated the given call.

A username of an individual who was logged into the given host computer when the given host computer that initiated execution of the given execution entity.

A call type for the given call. In embodiments described herein the call type is either direct or non-direct. In these embodiments, a non-direct call can indicate that the call to a given syscall 24 was from the normal WINDOWS™ API flow, and a direct call can indicate that the given call was issued by any execution entity 32 that is not a given DLL 70 (e.g., a given process 72).

Typically, a given DLL 70 calls a given syscall entity (i.e., a lower-level call) in response to receiving a (higher-level) call from a given process 72. Therefore, direct calls to syscalls 24 are typically more likely to be malicious than non-direct calls) since a malware attack may comprise a given process 72 calling the given syscall entity directly.

An event indicating a specific event that included the given call. Examples of events include a call to a given syscall entity and loading a given module 68 or a given DLL 70 (or any other type of software library).

Shellcode 76 comprising the given call.

A name of a folder (i.e., a directory) on a storage device (no shown), from which the execution entity that generated the given call originated (i.e., was stored prior to execution).

An injection flag indicating whether the execution entity that generated the given call was injected into memory 56.

A flag indicating whether the process that generated the given call was injected into memory 56 by a different process 74.

In embodiments herein, syscall ID 82, host ID 84, customer ID 86, date 88 and time 89, and return address 90 may also be referred to as examples of features 92.

In one embodiment, endpoint agent 78 (executing on processor 54) can classify the call type for the given call as direct or non-direct by comparing return address 90 to memory map records 94. In this embodiment, processor 54 identifies a given map record 94 for a given memory block 75 comprising return address 90 (i.e., return address is in a range of memory addresses 58 between starting address 100 and ending address 102. In other words, return address 90 is in the execution entity corresponding to the identified map record.

If file ID 98 in the identified map record references a given executable or DLL file 73, then endpoint agent 78 can classify the given call type for the given call as non-direct, since a given DLL (i.e., executable code processor 54 loaded from a given DLL file 73 or a given executable file 73) probably generated the given call in response to receiving a (high-level) call from a different execution entity 32, such as a given process 72 of a software application executing on the given host computer.

However, if file ID 98 in the identified map record is null (thereby indicating that the given call was from shellcode 76, as described supra), then the corresponding execution entity references a given DLL 70, and endpoint agent 78 can classify the given call type for the given call as direct, indicating that the given call is from (a given) shellcode 76.

Endpoint agent 78 (also known as an endpoint security agent or a security agent) comprises a software application that processor 54 can execute (typically in the background) so as to generate syscall data 34, and then convey the generated syscall data to security server 26. In some embodiments, endpoint agents 78 can generate unique respective host IDs 50 for host computers 22. One example of endpoint security agent 78 is CORTEX XDR™ produced by PALO ALTO NETWORKS INC., 3000 Tannery Way, Santa Clara, CA 95054 USA).

In embodiments herein, syscalls 24 comprise program instructions that can execute on processor 54, and upon the host processor initiating execution of endpoint agent 78, the endpoint agent can inject code 66 (also referred to herein as injected code 66) into the program instructions of a given syscall 24 (or into program instructions executed in response to a call to the given syscall) so as to transform the given syscall 24 into a given hooked syscall 24A. In some embodiments, upon processor 54 calling the given hooked syscall, injected code 66 in the given syscall can convey information about the call to endpoint agent 78.

Additionally, in embodiments described herein, memory addresses 58, return address 90, starting addresses 100 and ending addresses 102 all comprise virtual memory addresses in memory 56.

Figure 3:
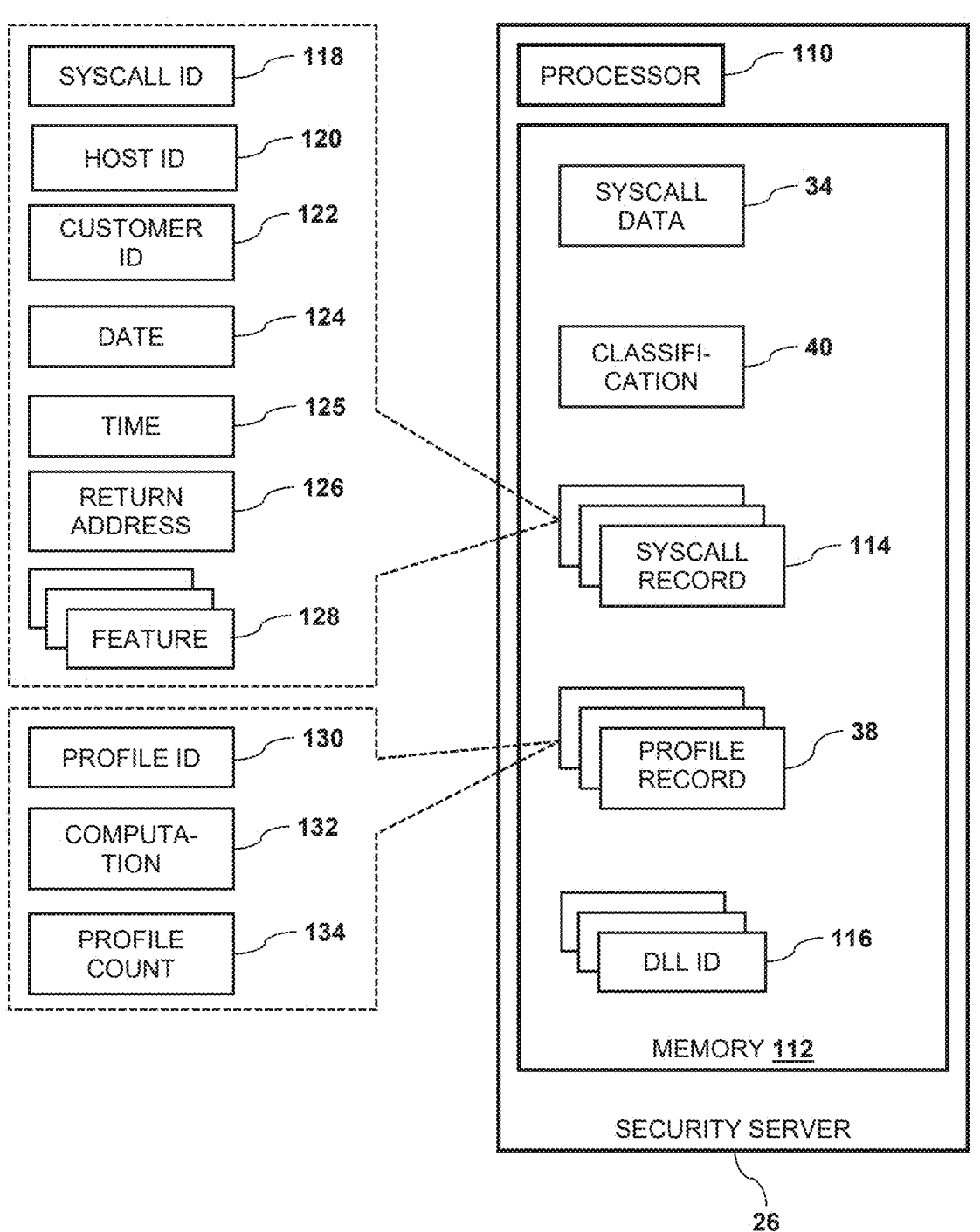
FIG. 3 is a block diagram showing hardware, software and data components of the security server, in accordance with an embodiment of the present invention.

FIG. 3 is a block diagram showing an example configuration of security server 26, in accordance with an embodiment of the present invention. In the configuration shown in FIG. 3, security server 26 comprises a server processor 110, and a server memory 112 that can be configured to store a copy of syscall data 34, profiles 38 (also referred to herein as profile records 38), a classification 40, syscall records 114 and DLL IDs 116.

In embodiments described hereinbelow, processor 110 (i.e., security server 26 can classify each call 30 as processor storing a first classification value to classification 40 indicating that the given call is malicious may also be referred to as classifying the given call as malicious, and processor 110 storing a second classification value to classification 40 indicating that the given call is not malicious may also be referred to as classifying the given call as benign (i.e., not malicious).

Syscall records 114 correspond to calls 30 captured by hooked syscalls 24A on host computers 22, and store information about the calls. In some embodiments, each given syscall record may comprise a syscall ID 118, a host ID 120, a customer ID 122, a date 124, a time 125, a return address 126, and a set of features 128. In these embodiments, upon processor 110 receiving syscall data 34 from a given host computer 22, the server processor can add a new syscall record 114, and store, in the new syscall record, syscall ID 82 to syscall id 118, host ID 84 to host ID 120, customer ID 86 to customer ID 122, date 88 to date 124, time 89 to time 125, return address 90 to return address 126, and features 92 to features 128.

In some embodiments, DLL IDs 116 reference respective DLLs 70. As described hereinbelow, processor 110 can classify calls 30 from these DLLs to syscalls 24 as not malicious (i.e., benign). In these embodiments, DLLs 70 corresponding (i.e., referenced) by DLL IDs 116 may be referred to as non-malicious DLLs 70.

In embodiments herein, syscall ID 118, host ID 120, customer ID 122, date 124, and return address 126 may also be referred to as examples of features 128.

Each given profile 38 (i.e., profile record 38) can store information such as a unique profile ID 130, a profile computation 132, and a profile count 134. In embodiments described herein, processor 54 can analyze syscall data 34 that the server processor received for a given call 30, and then apply a given profile 38 to a given call 30 by analyzing syscall records 114. In these embodiments, applying the given profile comprises using the profile computation (i.e., for the given profile), and computing the profile count (also for the given profile) based on a number of syscall records the server processor identifies in the applied profile computation.

In the examples of profiles 38 described hereinbelow, processor 110 analyzes calls 30 (including new calls 30) over a specified time period (i.e., multiple days e.g., the most recent 30 days). Processor 110 can apply the first four (i.e., first through fourth) profiles 38 to analyze direct calls 30 to syscalls 24 that originate from memory blocks 75 mapped to any DLL 70, and can apply the last four (i.e., fifth through eight) profiles 38 to analyze direct calls 30 to syscalls 24 that originate from memory blocks 75 mapped to any shellcode 76.

A first profile 38 is based on a first given feature 92 comprising a given mapped memory block 75 (i.e., in a given host computer 22) from which a given execution entity 32 generated at least one direct call 30.

In the first profile, a first profile computation 132 comprises processor 110 identifying a number of distinct execution entities 32 that generated a direct syscall call 30 from the given mapped memory block (i.e., identical to the first feature), and a second profile computation 132 comprises the server processor identifying a number of distinct days when there were direct syscall calls 30 from the given mapped memory block (i.e., identical to the first feature) in the host computers for a given organization 52.

In some embodiments, processor 110 can use the first profile to classify a given call 30 as malicious if the first profile computation is less than a first threshold (e.g., 4, 5, or 6) and/or the second profile computation is less than a second threshold (e.g., 5, 6 or 7).

A second profile 38 is based on a first specified key comprising a second feature 92 and the first feature, the second feature comprising a given execution entity 32 (e.g., a given process 72) that conveyed a one or more direct calls 30, and the first feature comprising a given mapped memory block 75 from which a given execution entity 32 generated at least one direct call 30.

In the second profile, a third profile computation 132 comprises processor 110 identifying a number of distinct host computers 22 having the first specified key, and a fourth profile computation 132 comprises the server processor identifying a number of distinct days when host computers 22 in a given organization 52 had the first specified key.

In some embodiments, processor 110 can use the second profile to classify a given call 30 as malicious if the third profile computation is less than a third threshold (e.g., 4, 5, or 6) and/or the fourth profile computation is less than a fourth threshold (e.g., 2, 3 or 4).

A third profile 38 is based on the first key specified in the second profile.

In the third profile, a fifth profile computation 132 comprises processor 110 identifying a number of distinct organizations 52 having host computers 22 that had the first specified key.

In some embodiments, processor 110 can use the third profile to classify a given call 30 as malicious if the fifth profile computation is less than a fifth threshold (e.g., 6, 7 or 8).

A fourth profile 38 is based on a second specified key comprising the second feature and a third feature 92, the second feature comprising a given execution entity 32 (e.g., a given process 72) that conveyed one or more direct calls 30, and the third feature comprising a given syscall 24A (i.e., that was called).

In the fourth profile, a sixth profile computation 132 comprises processor 110 identifying a number of distinct mapped memory blocks 75 in host computers 22 having the second specified key, a seventh profile computation 132 comprises the server processor identifying a number of distinct host computers 22 having the second specified key, and an eighth profile computation 132 comprises the server processor identifying a number of distinct days in which host computers 22 in a given organization 52 had the second specified key.

In some embodiments, processor 110 can use the fourth profile to classify a given call 30 as malicious if the sixth profile computation is less than a sixth threshold (e.g., 2, 3, or 4) and/or the seventh profile computation is less than a seventh threshold (e.g., 3, 4 or 5) and/or the eighth profile computation is less than an eighth threshold (e.g., 2, 3 or 4).

A fifth profile 38 is based on a fourth feature 92 comprising a given execution entity 32 (e.g., a given process 72) that one or more host computers 20 executed from shellcode 76, and that conveyed one or more direct calls 30.

In the fifth profile, a ninth profile computation 132 comprises processor 110 identifying a number of distinct host computers 22 having the fourth feature (i.e., identical to the sixth given feature), a tenth profile computation 132 comprises the server processor identifying a number of distinct days wherein at least one host computer 22 in a given organization 52 had the fourth (i.e., identical) feature, and an eleventh profile computation comprises the server processor identifies a number of distinct shellcode headers 76 in shellcodes 72 that had respective execution entities identical to the fourth feature.

In some embodiments, processor 110 can use the fifth profile to classify a given call 30 as malicious if the ninth profile computation is less than a ninth threshold (e.g., 4, 5, or 6) and/or the tenth profile computation is less than a tenth threshold (e.g., 4, 5 or 6) and/or the eleventh profile computation is less than an eleventh threshold (e.g., 4, 5 or 6).

A sixth profile 38 is based on a third specified key comprising the fourth feature and a fifth feature 92, the fourth feature comprising a given execution entity 32 (e.g., a given process 72) from shellcode 76 that conveyed one or more direct calls 30, and the fifth feature comprising a given shellcode header 77 for a given shellcode 76 that spawned a given execution entity 32 that conveyed one or more direct syscalls 24.

In the sixth profile, a twelfth profile computation 132 comprises processor 110 identifying a number of host computers 20 having the third specified key, and a thirteenth profile computation 132 comprises the server processor identifying a number of distinct days where at least one host computer 22 in a given organization 52 had the third specified key.

In some embodiments, processor 110 can use the sixth profile to classify a given call 30 as malicious if the twelfth profile computation is less than a twelfth threshold (e.g., 3, 4 or 5) and/or the thirteenth profile computation is less than a thirteenth threshold (e.g., 2, 3 or 4).

A seventh profile 38 is based on the third specified key defined in the sixth profile.

In the seventh profile, a fourteenth profile computation 132 comprises the server processor identifying a number of distinct organizations having at least one host computer 22 having the third specified key.

In some embodiments, processor 110 can use the seventh profile to classify a given call 30 as malicious if the fourteenth profile computation is less than a fourteenth threshold (e.g., 7, 8 or 9)

An eighth profile 38 is based on a fourth specified key comprising the third feature and the fifth feature, the third feature comprising a given syscall 24A, and the fifth feature comprising a given shellcode header 77 for a given shellcode 76 that spawned a given execution entity 32 that conveyed one or more direct syscalls 24.

In the eighth profile, a fifteenth profile computation 132 comprises processor 110 identifying a number of host machines 22 having the fourth specified key, a sixteenth profile computation 132 comprises the server processor identifying a number of distinct days where at least one host computer 22 in a given organization 52 had the fourth specified key, and a seventeenth profile computation 132 comprises the server processor identifying a number of distinct execution entities 32 having the fourth specified key.

In some embodiments, processor 110 can use the eighth profile to classify a given call 30 as malicious if the fifteenth profile computation is less than a fifteenth threshold 136 (e.g., 4, 5 or 6) and/or the sixteenth profile computation is less than a sixteenth threshold (e.g., 4, 5 or 6) and/or the seventeenth profile computation is less than a seventeenth threshold (e.g., 2, 3 or 4).

In the examples of profiles 38 described supra, having a given key comprise having features identical to the key, and identifying that a given profile computation is less than a given threshold comprises identifying that the given profile computation is less than the given threshold in response to comparing the given profile computation to the given threshold.

Processors 54 and 112 comprise one or more general-purpose central processing units (CPU) or special-purpose embedded processors, which are programmed in software or firmware to carry out the functions described herein. This software may be downloaded to host computers 22 and/or security server 26 in electronic form, over a network, for example. Additionally or alternatively, the software may be stored on tangible, non-transitory computer-readable media, such as optical, magnetic, or electronic memory media. Further additionally or alternatively, at least some of the functions of processors 54 and 110 may be carried out by hard-wired or programmable digital logic circuits.

Examples of memories 56 and 112 include dynamic random-access memories and non-volatile random-access memories, hard disk drives and solid-state disk drives.

In some embodiments, tasks described herein performed by processors 54 and 110 may be split among multiple physical and/or virtual computing devices. In other embodiments, these tasks may be performed in a managed cloud service.

Direct Syscall Call Detection and Classification

Figure 4:
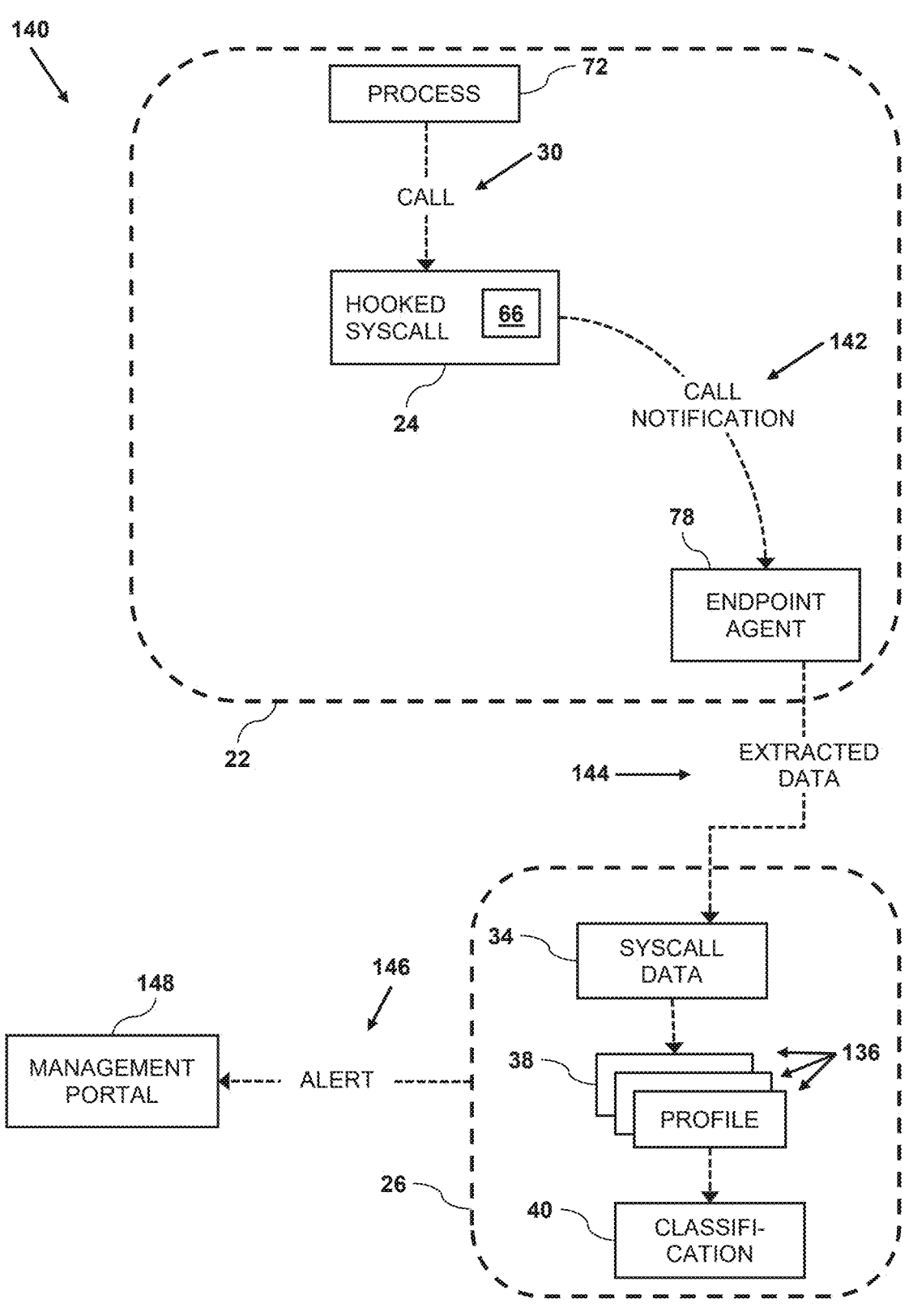
FIG. 4 is a block diagram that schematically illustrates data flow for detecting a malicious call to a given syscall, in accordance with an embodiment of the present invention.

FIG. 4 shows a data flow 140 showing classification of a given call 30, in accordance with an embodiment of the present invention. As shown in FIG. 4:

A given process 72 on a given host computer 22 generates a given call 30 to a given hooked syscall 24A.

Injected code 66 in the given hooked syscall 24A detects the call and conveys a call notification 142 to endpoint agent 78 executing on the given host computer.

The endpoint agent generates extracted data 144 from the notification, generates syscall data 34 from the extracted data, and conveys the syscall data to security server 26.

Security server 26 applies one or more profiles 38 to syscall data 34, compares the profile counts in the one or more profiles 38 to their respective thresholds (as describe supra), generates classification 40 based on the comparison(s), and conveys the classification to the corresponding hooked syscall.

If classification 40 is malicious, then security server 26 can generate and convey, to a management portal 148, an alert 146 for the given process. In some embodiments, management portal 148 comprises a web-based interface that provides administrators with a centralized platform that enables a chief information security officer (CISO) or a security operations center (SOC) team to manage, monitor, and control various aspects of their IT infrastructure.

Figure 5:
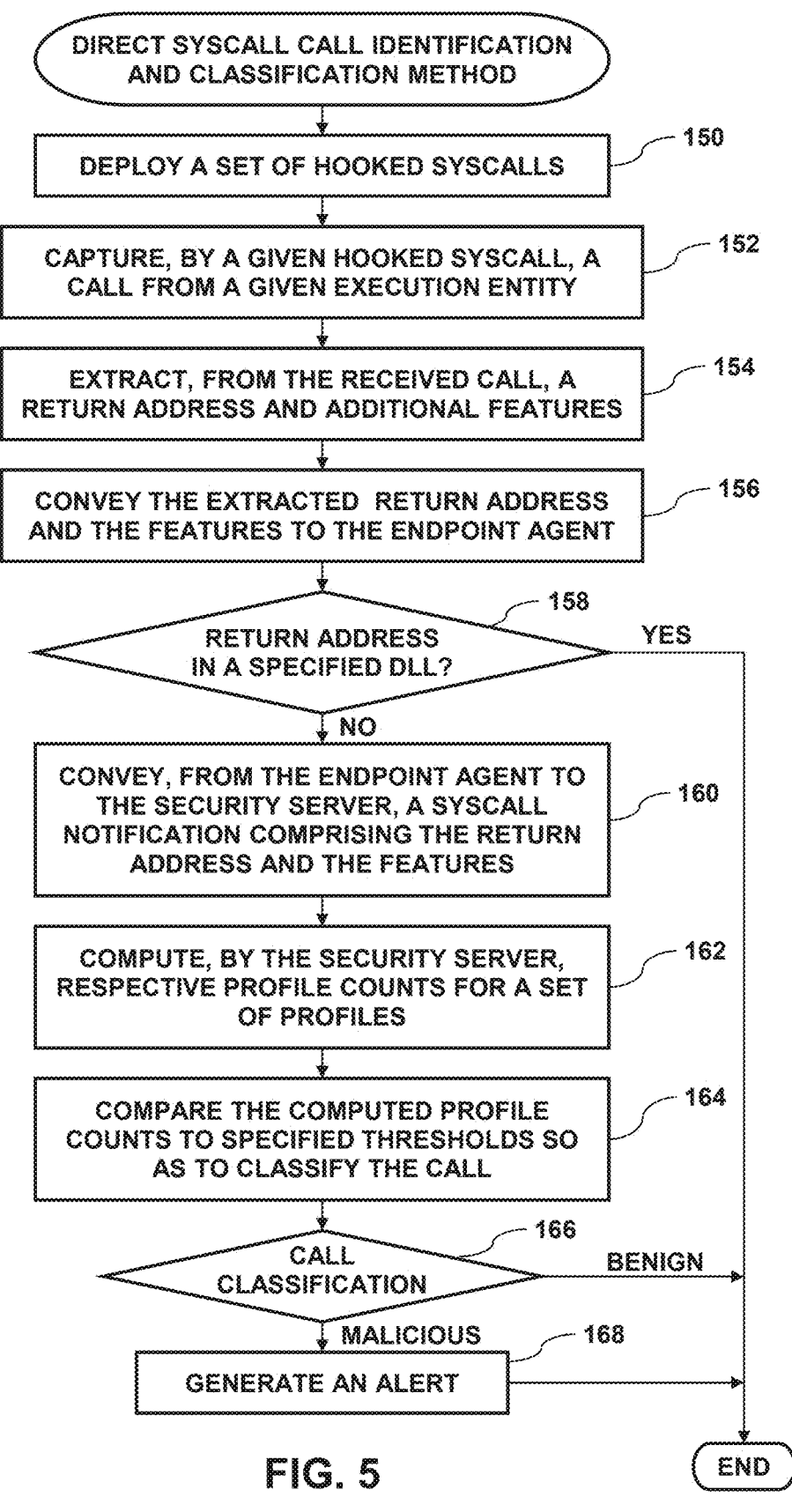
FIG. 5 is a flow diagram that schematically illustrates a method for detecting malicious calls to a syscall, in accordance with an embodiment of the present invention.

FIG. 5 is a flow diagram that schematically illustrates a method of detecting and classifying calls 30 to syscalls 24, in accordance with an embodiment of the present invention.

Prior to performing the steps described hereinbelow, processor 110 receives, during a training period (e.g., 30 days) from respective endpoint agents 78 on multiple host computers (in multiple organizations 52), respective instances of syscall data 34 for direct syscalls 30 detected by the respective endpoint agents. Upon receiving each instance of syscall data 34, processor 110 can add a new syscall record 114, and populate the new syscall record with information in the received instance of the syscall data.

In step 150, host computers 22 deploy (i.e., processors 54 load to their respective host memories and initiate execution of) endpoint agents 78. As described supra, endpoint agents inject code 66 into a set of syscalls 24 so as to configure hooked syscalls 24A.

In step 152, injected code 66 in a given hooked syscall 24A (executing on a given processor 54 in a given host computer 22) captures a new call 30 conveyed by a given execution entity 32 (e.g., a given DLL 70 or a given process 72 to (i.e., that was intended for) the corresponding operating system syscall 66).

In step 154, the injected code in the given hooked syscall extracts, from the new call, return address 90 and additional features 92. Upon extracting this information from the given call, the given hooked syscall stores return address 90 and the extracted features 92 to syscall data 34.

In step 156, the given hooked syscall conveys syscall data 34 to the endpoint agent executing on the given host computer.

In step 158, endpoint agent 78 analyzes (e.g., using memory map 80) return address 90 so as to detect whether the return address is in a "known" DLL 70. In embodiments herein, if return address 90 is not in a given "unknown" DLL 70, then endpoint agent 78 can classify the new call as direct (i.e., a direct syscall), and if the return address is in a given "known" DLL 70, then endpoint agent 78 can classify the new call as non-direct (i.e., a non-direct syscall).

In these embodiments, endpoint agent 78 can detect if a given DLL 70 is "known" (e.g., a system DLL such as NTDLL.DLL) by comparing the DLL ID 71 for the given DLL to DLL IDs 116. If DLL ID 71 matches any DLL ID 116, then endpoint agent 78 can classify the given DLL as known, and the endpoint agent can classify the new call as non-direct. Likewise, if DLL ID 71 does not match any DLL ID 116, then endpoint agent 78 can classify the given DLL as unknown, and the endpoint agent can classify the new call as direct.

In some embodiments, starting addresses 100 and ending addresses 102 in memory map records 94 define respective blocks in memory 56, and processor 54 can identify a given memory map record 94 referencing a given block comprising return address 90. If file ID 98 in the identified memory map record indicates (i.e., as described supra) that the respective block is allocated to a given "known" DLL 70 (i.e., executable code processor 54 loaded from a given DLL file 73 or a given executable file 73), then endpoint agent 78 can classify the new call as a direct syscall (i.e., direct). Likewise, if file ID 98 in the identified memory map record does not that the respective block is allocated to indicate a given DLL 70 (i.e., the given DLL is unknown), then endpoint agent 78 4 can classify the new call as a non-direct syscall (i.e., non-direct).

In these embodiments: if return address 90 references a given memory block 75 comprising shellcode 76, then endpoint agent 78 can classify the new call as a direct syscall. However, if return address 90 references a given memory block 75 comprising a given DLL 70, then If endpoint agent 78 classifies (e.g., using embodiments described supra) the given DLL (or executable file) as known (e.g., a system DLL that is used to execute syscalls), then the endpoint agent can classify the new call as non-direct.

If endpoint agent 78 classifies the given DLL (or executable file) as unknown, then the endpoint agent can classify the new call as direct.

If the given hooked syscall detects that return address 90 is not in a given system (i.e., known) DLL 70, then in step 160, the endpoint agent in the given host computer conveys, to security server 26, notification 142 comprising syscall data 34. Upon receiving syscall data 34, processor 110 can add a new syscall record 114, and populate the new syscall record with information stored in the received syscall data, as described supra.

In step 162, processor 110 applies profiles 38 to the received syscall data. As described supra, applying profiles 38 comprises computing their respective profile counts 134 for the new call.

In step 164, processor 110 compares the computed profile counts to the appropriate threshold (as described supra) so as to generate classification 40 for the new call. In embodiments herein, classification 40 indicates whether the new call is suspected of being benign or malicious.

In step 166, if classification 40 indicates that the new call in is malicious, then in step 168, processor 110 can generate alert 146, and the method ends.

Returning to step 166, if classification 40 indicates that the new call in is benign then the method ends.

Returning to step 158, if return address 90 is in a given known DLL 70, then the method ends.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for protecting a computer, comprising:
   deploying in a memory of the computer a hooked version of a syscall used by an operating system kernel of the computer;
   receiving, from the hooked version of the syscall, a notification of a call to the hooked version of the syscall from a user mode of the computer, the notification comprising a return address in the memory and a set of features extracted from the call;
   analyzing the return address and the received features so as to classify the call as benign or malicious; and
   generating, for the computer, an alert upon classifying the new call as malicious,
   wherein classifying the call as malicious comprises classifying the call as a direct call, and
   wherein the call comprises a new call, and wherein the features further comprise additional features from previous direct calls to the hooked version of the syscall by execution entities executing in the memory of the computer and additional computers, wherein the new call and previous calls were conveyed during multiple days, and wherein one or more organizations comprise the computers.

2. The method according to claim 1, wherein analyzing the return address comprises identifying the return address as belonging to a specified block in a user-mode segment of the memory.

3. The method according to claim 2, wherein the specified block is not allocated to a specified DLL.

4. The method according to claim 1, wherein a given feature comprises a mapped block in the memory comprising the execution entities, wherein analyzing the features comprises identifying a number of distinct execution entities that generated the direct calls from the mapped block, and wherein classifying the new call as malicious comprises identifying that identified number is less than a specified threshold.

5. The method according to claim 1, wherein a given feature comprises a mapped block in the memory comprising the execution entities, wherein analyzing the features comprises identifying a number of distinct days when any of the computers having the given feature, and wherein classifying the new call as malicious comprises identifying that identified number is less than a specified threshold.

6. The method according to claim 1, and further comprising defining a key comprising first and second features, the first feature comprising a given execution entity that conveyed one or more of the direct calls, and the second feature comprising a mapped block in the memory comprising an execution entity that generated one or more of the direct calls, wherein analyzing the features comprises identifying a number of distinct computers having the key, and wherein classifying the new call as malicious comprises identifying that identified number is less than a specified threshold.

7. The method according to claim 1, and further comprising defining a key comprising first and second features, the first feature comprising a given execution entity that conveyed one or more of the direct calls, and the second feature comprising a mapped block in the memory comprising an execution entity that generated one or more of the direct calls, wherein analyzing the features comprises identifying a number of distinct days when any of the computers have the key, and wherein classifying the new call as malicious comprises identifying that identified number is less than a specified threshold.

8. The method according to claim 1, and further comprising defining a key comprising first and second features, the first feature comprising a given execution entity that conveyed one or more of the direct calls, and the second feature comprising a mapped block in the memory comprising an execution entity that generated one or more of the direct calls, wherein analyzing the features comprises identifying a number of distinct organizations comprising the computers having the key, and wherein classifying the new call as malicious comprises identifying that identified number is less than a specified threshold.

9. The method according to claim 1, and further comprising defining a key comprising first and second features, the first feature comprising a given execution entity that conveyed one or more of the direct calls, and the second feature comprising the hooked version of the syscall, wherein analyzing the features comprises identifying a number of distinct memory blocks comprising the key, and wherein classifying the new call as malicious comprises identifying that identified number is less than a specified threshold.

10. The method according to claim 1, and further comprising defining a key comprising first and second features, the first feature comprising a process that conveyed one or more of the direct calls, and the second feature comprising the hooked version of the syscall, wherein analyzing the features comprises identifying a number of distinct computers comprising the key, and wherein classifying the new call as malicious comprises identifying that identified number is less than a specified threshold.

11. The method according to claim 1, and further comprising defining a key comprising first and second features, the first feature comprising a given execution entity that conveyed one or more of the direct calls, and the second feature comprising the hooked version of the syscall, wherein analyzing the features comprises identifying a number of distinct days when any of the computers have the key, and wherein classifying the new call as malicious comprises identifying that identified number is less than a specified threshold.

12. The method according to claim 1, wherein one or more of the computers execute shellcodes comprising respective shellcode headers.

13. The method according to claim 12, wherein a given feature comprises a given execution entity that one or more of the computers executed from any of the shellcodes, and that conveyed one or more of the direct calls, wherein analyzing the features comprises identifying a number of distinct computers having the given feature, and wherein classifying the new call as malicious comprises identifying that identified number is less than a specified threshold.

14. The method according to claim 12, wherein a given feature comprises a given execution entity that one or more of the computers executed from any of the shellcodes, and that conveyed one or more of the direct calls, wherein analyzing the features comprises identifying a number of distinct days when any of the computers have the given feature, and wherein classifying the new call as malicious comprises identifying that identified number is less than a specified threshold.

15. The method according to claim 12, wherein a given feature comprises a given execution entity that one or more of the computers executed from any of the shellcodes, and that conveyed one or more of the direct calls, wherein analyzing the features comprises identifying a number of distinct shellcode headers having execution entities identical to the given feature, and wherein classifying the new call as malicious comprises identifying that identified number is less than a specified threshold.

16. The method according to claim 12, and further comprising defining a key comprising first and second features, the first feature comprising a given execution entity that one or more of the computers executed from any of the shellcodes, and the second feature a given shellcode header for a given shellcode that spawned a given execution entity, wherein analyzing the features comprises identifying a number of distinct computers having the key, and wherein classifying the new call as malicious comprises identifying that identified number is less than a specified threshold.

17. The method according to claim 12, and further comprising defining a key comprising first and second features, the first feature comprising a given execution entity that one or more of the computers executed from any of the shellcodes, and the second feature a given shellcode header for a given shellcode that spawned a given execution entity, wherein analyzing the features comprises identifying a number of distinct days when any of the computers have the key, and wherein classifying the new call as malicious comprises identifying that identified number is less than a specified threshold.

18. The method according to claim 12, and further comprising defining a key comprising first and second features, the first feature comprising a given execution entity that one or more of the computers executed from any of the shellcodes, and the second feature a given shellcode header for a given shellcode that spawned a given execution entity, wherein analyzing the features comprises identifying a number of distinct organizations comprising the computers having the key, and wherein classifying the new call as malicious comprises identifying that identified number is less than a specified threshold.

19. The method according to claim 12, and further comprising defining a key comprising first and second features, the first feature comprising the hooked version of the syscall, and the second feature a given shellcode header for a given shellcode that spawned a given execution entity, wherein analyzing the features comprises identifying a number of distinct computers having the key, and wherein classifying the new call as malicious comprises identifying that identified number is less than a specified threshold.

20. The method according to claim 12, and further comprising defining a key comprising first and second features, the first feature comprising the hooked version of the syscall, and the second feature a given shellcode header for a given shellcode that spawned a given execution entity, wherein analyzing the features comprises identifying a number of distinct days when any of the computers in a given organization have the key, and wherein classifying the new call as malicious comprises identifying that identified number is less than a specified threshold.

21. The method according to claim 12, and further comprising defining a key comprising first and second features, the first feature comprising the hooked version of the syscall, and the second feature a given shellcode header for a given shellcode that spawned a given execution entity, wherein analyzing the features comprises identifying a number of distinct execution entities having the key, and wherein classifying the new call as malicious comprises identifying that identified number is less than a specified threshold.

22. A security server, comprising:

a memory; and a processor configured:

to deploy, in the memory, a hooked version of a syscall used by an operating system kernel of a computer, to receive, from the computer, a notification of a call to a hooked version of the syscall from a user mode of the second computer, the notification comprising a return address in the memory and a set of features extracted from the call, to analyze the return address and the received features so as to classify the call as benign or malicious, and to generate, for the computer, an alert upon classifying the new call as malicious, wherein classifying the call as malicious comprises classifying the call as a direct call, and wherein the call comprises a new call, and wherein the features further comprise additional features from previous direct calls to the hooked version of the syscall by execution entities executing in the memory of the computer and additional computers, wherein the new call and previous calls were conveyed during multiple days, and wherein one or more organizations comprise the computers.

23. A computer software product for protecting a computer, the computer software product comprising a non-transitory computer-readable medium, in which program instructions are stored, which instructions, when read by the computer, cause the computer:

to deploy in a memory of the computer a hooked version of a syscall used by an operating system kernel of the computer;

to receive, from the hooked version of the syscall, a notification of a call to the hooked version of the syscall from a user mode of the computer, the notification comprising a return address in the memory and a set of features extracted from the call;

to analyze the return address and the received features so as to classify the call as benign or malicious; and to generate, for the computer, an alert upon classifying the new call as malicious, wherein classifying the call as malicious comprises classifying the call as a direct call, and wherein the call comprises a new call, and wherein the features further comprise additional features from previous direct calls to the hooked version of the syscall by execution entities executing in the memory of the computer and additional computers, wherein the new call and previous calls were conveyed during multiple days, and wherein one or more organizations comprise the computers.

* * * * *